Patented May 1, 1928.

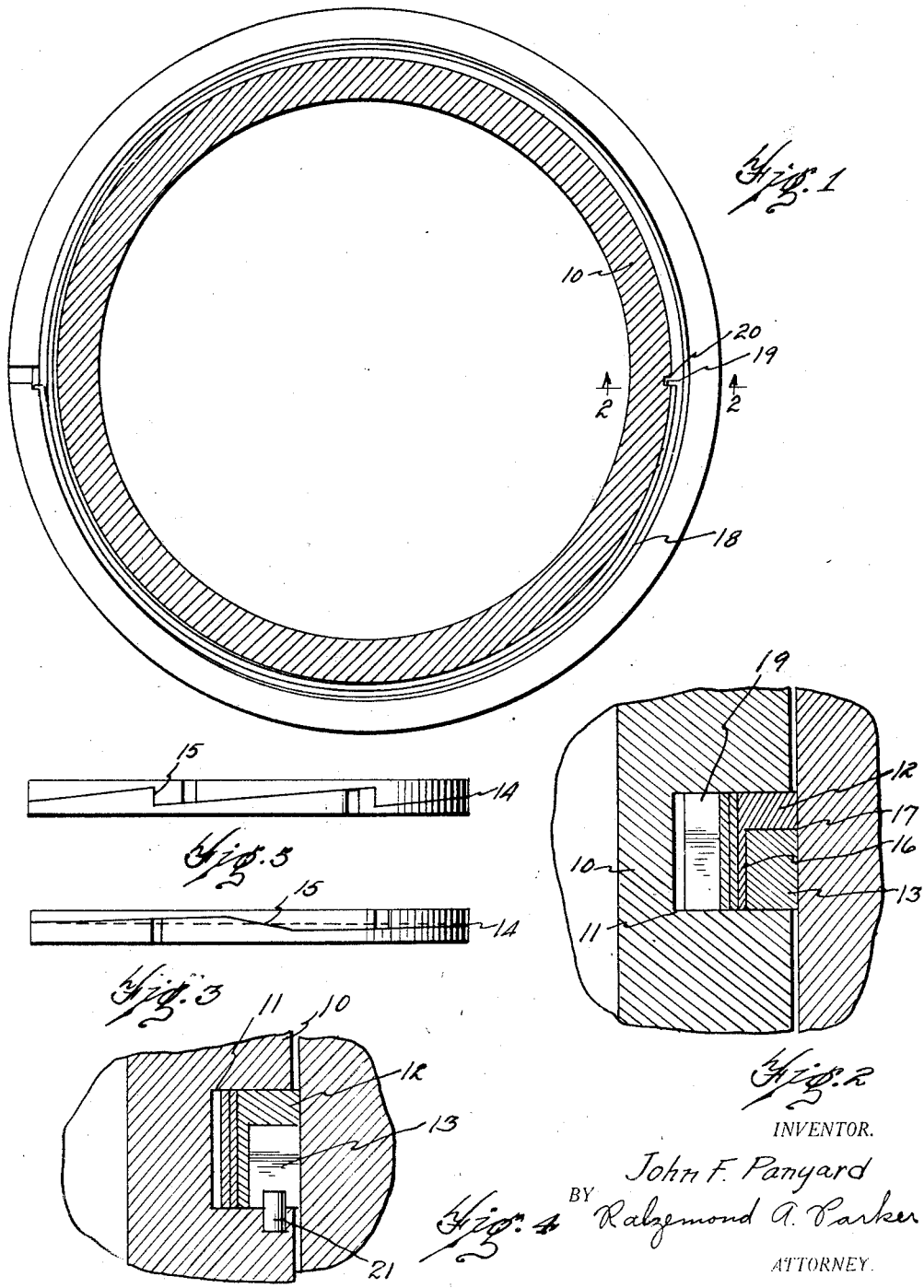

1,667,947

UNITED STATES PATENT OFFICE.

JOHN F. PANYARD, OF DETROIT, MICHIGAN.

PISTON PACKING.

Application filed August 20, 1923. Serial No. 658,199.

My invention relates to improvements in piston packing.

My particular improvement relates to that type of piston packing in which the packing rings are provided with longitudinally tapered meeting faces oppositely disposed so that relative rotation counter the taper produces axial expansion of the packing within the groove of the piston, thereby providing a tight leak-proof joint between the packing rings and the side walls of the packing groove, and also to improvements in the construction and mounting of such a packing whereby the packing effectively seals the joint at the side walls of the groove and with the wall of the cylinder in which the piston is mounted.

An object is to provide improved packing of such a character having one section rotatable within the groove of the piston and held under spring pressure to produce rotation counter its tapered face to wedge the packing axially against the side walls of the piston groove.

A meritorious feature of my invention is to provide a packing consisting of split packing rings longitudinally tapered so relatively disposed in the groove in the piston that rotation of one ring counter the taper of the other wedges the packing rings axially in the grooves against the side walls thereof, one ring section being of such a width at the base as to substantially fill the groove.

Another element of importance is the provision of a spring to exert rotatable pressure on one ring section counter the tapered face of the other to axially expand the packing against the side walls of the groove and to exert radial pressure on the packing to hold the same against the cylinder wall. This spring is preferably coiled about the piston in the bottom of the groove and is secured at one end to the piston and at the other end to the ring to exert a rotatable impulse thereon. The spring may be turned up at one end into the split of the ring underneath which it is located to exert rotatable pressure on said ring tending to expand the combined packing rings axially within the groove.

Another meritorious object is to provide, in packing of this character, a ring having a base flange approximately the width of the groove, and a tapered lateral face forming an angle therewith, as above set forth, which ring is held under tension by a spring, as described, in combination with a second ring which is seated on the base flange of the first ring between the tapered lateral face thereof and the opposite side wall of the groove and is itself tapered counter the taper of the first ring, which second ring may be anchored to the piston or free to rotate by virtue of its frictional engagement with the first ring.

Reference is made herein to inventor's application Serial No. 594,445 and No. 601,685, each of which show in part the construction herein described and claimed,—application No. 594,445 corresponding to Figs. 1, 2, 3 and 5 of the drawing, and application No. 601,685 corresponding to Fig. 4 of the drawing, except for the improved type of spring mounting herein described.

In the drawings,—

Figure 1 is a cross-sectional view through a piston provided with my improved packing.

Fig. 2 is a sectional view taken on the line 2—2 of Fig. 1.

Fig. 3 is a side elevation of my improved packing ring.

Fig. 4 is a cross-sectional view through my packing seated in a piston groove showing one modification thereof.

Fig. 5 is a side elevation of a modified form of my packing.

In the drawings, let 10 indicate a piston provided with the usual peripheral packing groove 11 which is designed to receive packing rings. I provide a plurality of cooperating split rings having longitudinally tapered lateral meeting faces oppositely disposed within the groove so that rotation of one ring section counter the taper of the other tends to expand the combined packing axially within the groove, wedging the same against the side walls thereof.

In the third embodiment of my invention herein illustrated I show a pair of split ring sections 12 and 13 having oppositely tapered lateral meeting faces 14 which may be formed as a continuous longitudinal tapered face such as shown in Fig. 3 or a lateral face made up of a succession of longitudinally inclined faces such as shown in Fig. 5. In Fig. 5 I have also shown the abutting shoulders 15 of the separate ring sections as being at right angles to the outer lateral faces thereof, while in Fig. 3 I have shown the abutting shoulders 15 as beveled. Either construction is suitable.

The type of packing illustrated in Fig. 2 I have found to be very satisfactory and in this construction the ring section 12 is provided with a base flange 16 which approximately fills the bottom of the groove of the piston and a longitudinally tapered lateral face 17 which intersects the outer face of the ring section and the upper face of the base flange. The co-operating ring section 13 is seated on the base flange of the first ring section between the tapered lateral face 17 and the opposite side wall of the groove. The tapered face of the second ring section contacts the tapered face of the first ring section.

This section ring section may be anchored in the piston as shown in Fig. 4 by means of a pin 21 against rotatable movement while having a permitted axial movement within the groove or it may be free to rotate within the groove as shown in Fig. 1 in which case it would receive an impulse of rotation by virtue of its frictional engagement with the first ring section which is held under rotatable spring pressure.

To produce axial expansion of the packing in the groove I prefer to use a flat spring 18 arranged in successive coils about the piston in the bottom of the groove underneath the ring section 12. This spring is secured to the piston and the method of securing the same may be that shown in Fig. 1 in which the end of the spring as at 19 is turned into a notch 20 formed in the bottom of the groove of the piston. The opposite end of the spring is secured to the ring to exert an impulse of rotation thereon and a convenient method of attachment is to turn the end of the spring into the split of the ring as illustrated. The spring 18 also exerts a radial expansible pressure on the packing to hold it outwardly against the cylinder wall. The rings, however, may be inherently expansible to hold compression with the cylinder.

What I claim is:

1. In piston packing, a piston having a groove for packing, packing in said groove comprising split ring sections having lateral helical meeting surfaces, one of said sections being rotatably disposed within the groove and having an axial flange forming an angle with its helical surface, the other section anchored between the helical surface and axial flange of the first section and the opposite side wall of the groove, and a spring about the piston in the bottom of the groove turned downwardly at one end and anchored to the piston and turned upwardly at the other end into the split of the rotatable ring section to exert rotatable pressure thereon counter the anchored section.

2. In piston packing, a piston having a groove for packing, provided with a recess in the bottom of the groove, packing in said groove comprising cooperating split ring sections having lateral helical meeting surfaces, one of said sections being rotatably disposed within the groove and having a base flange seated in the bottom of the groove, the other section rotatably superposing the base flange of the first section between the helical face thereof and a side wall of the groove, said other section being anchored within the groove, and a spring encircling the piston within the groove, said spring turned downwardly at one end into said recess in the groove in the piston and turned upwardly at the other end into the split of the rotatable ring section to exert a rotatable impulse thereon.

In testimony whereof, I sign this specification.

JOHN F. PANYARD.